Sept. 12, 1967 H. J. SWEENEY 3,341,844
RADAR WIND GUST ANALYZER
Filed Aug. 23, 1965 4 Sheets-Sheet 1
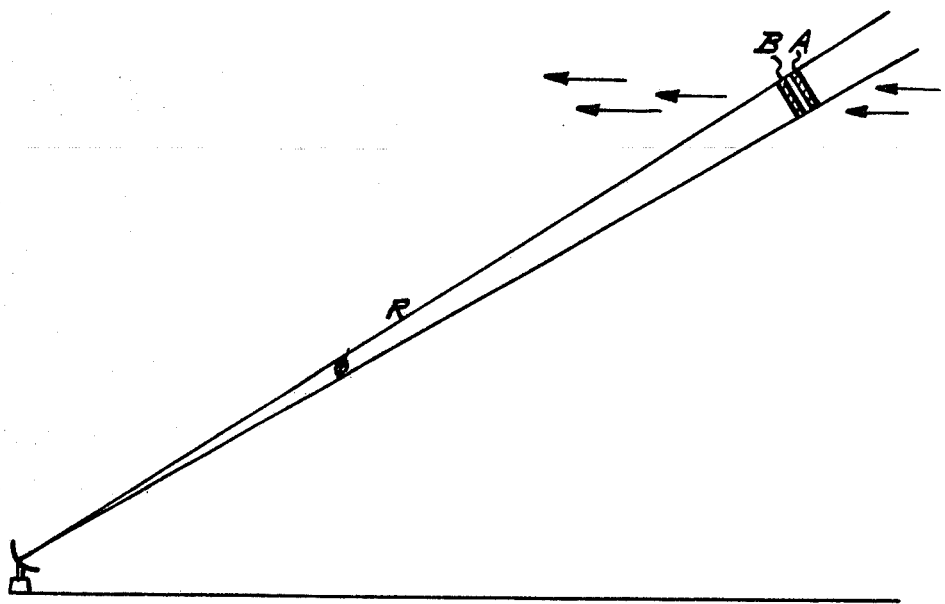
Fig. 1
 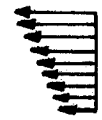 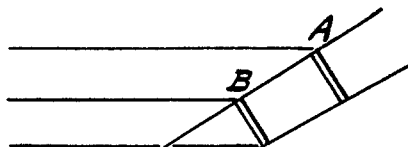
CASE I   CASE II
Fig. 5
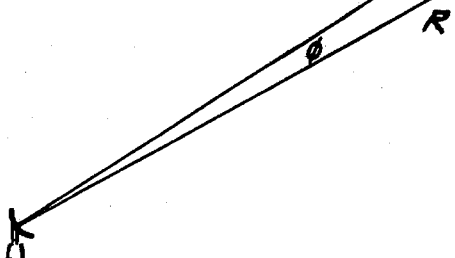
INVENTOR.
HUGH J. SWEENEY
BY Harry A. Herbert Jr.
Herbert F. Farmer
ATTORNEYS

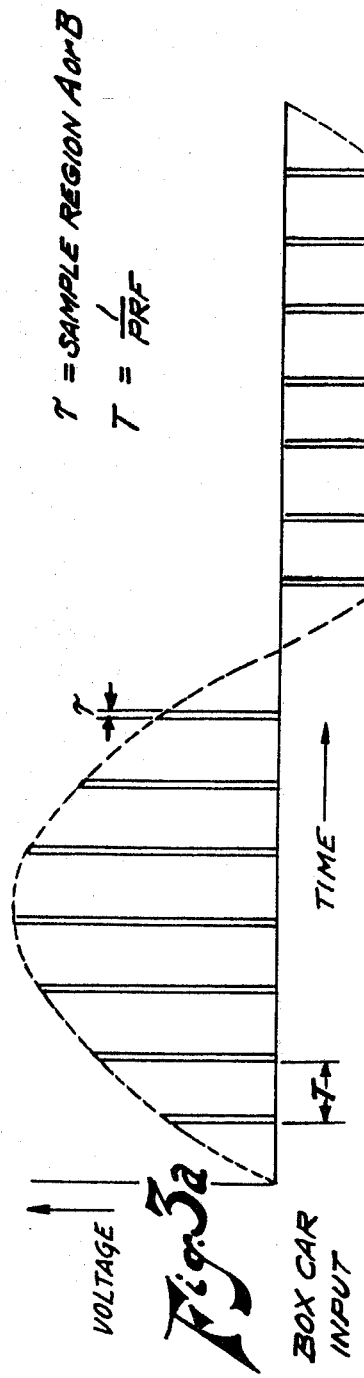
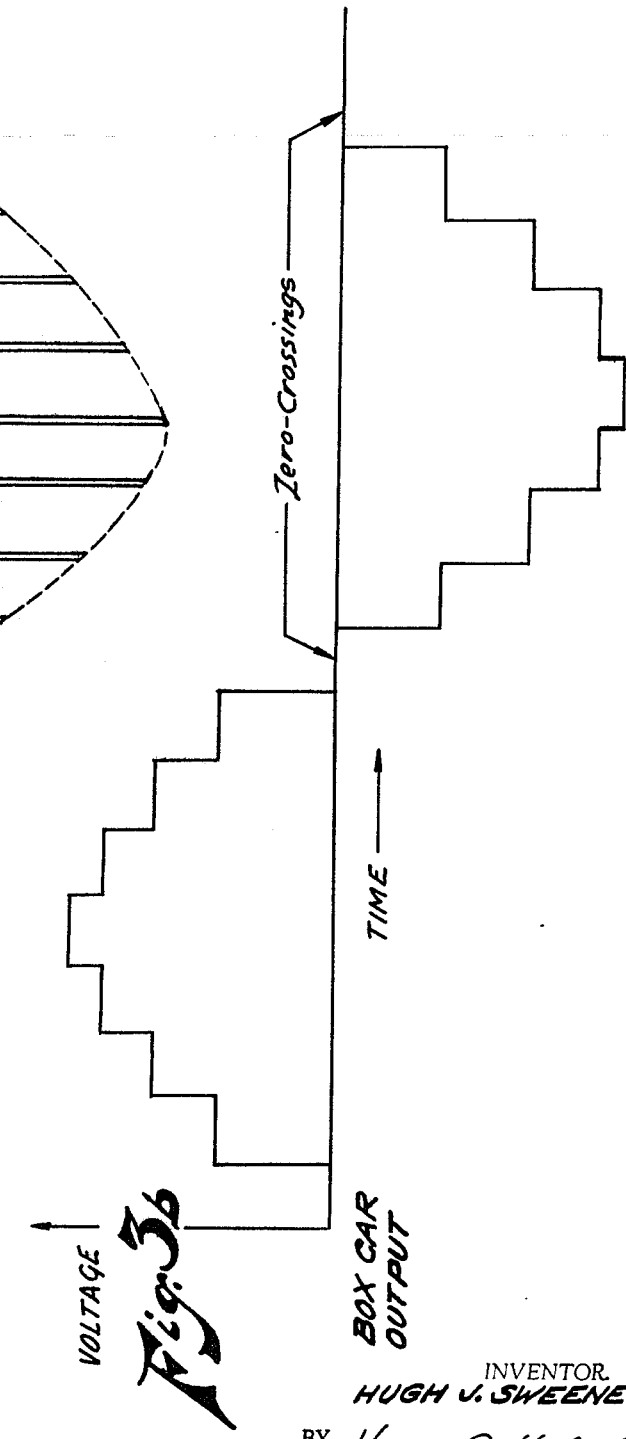

Sept. 12, 1967        H. J. SWEENEY        3,341,844
RADAR WIND GUST ANALYZER
Filed Aug. 23, 1965        4 Sheets-Sheet 4
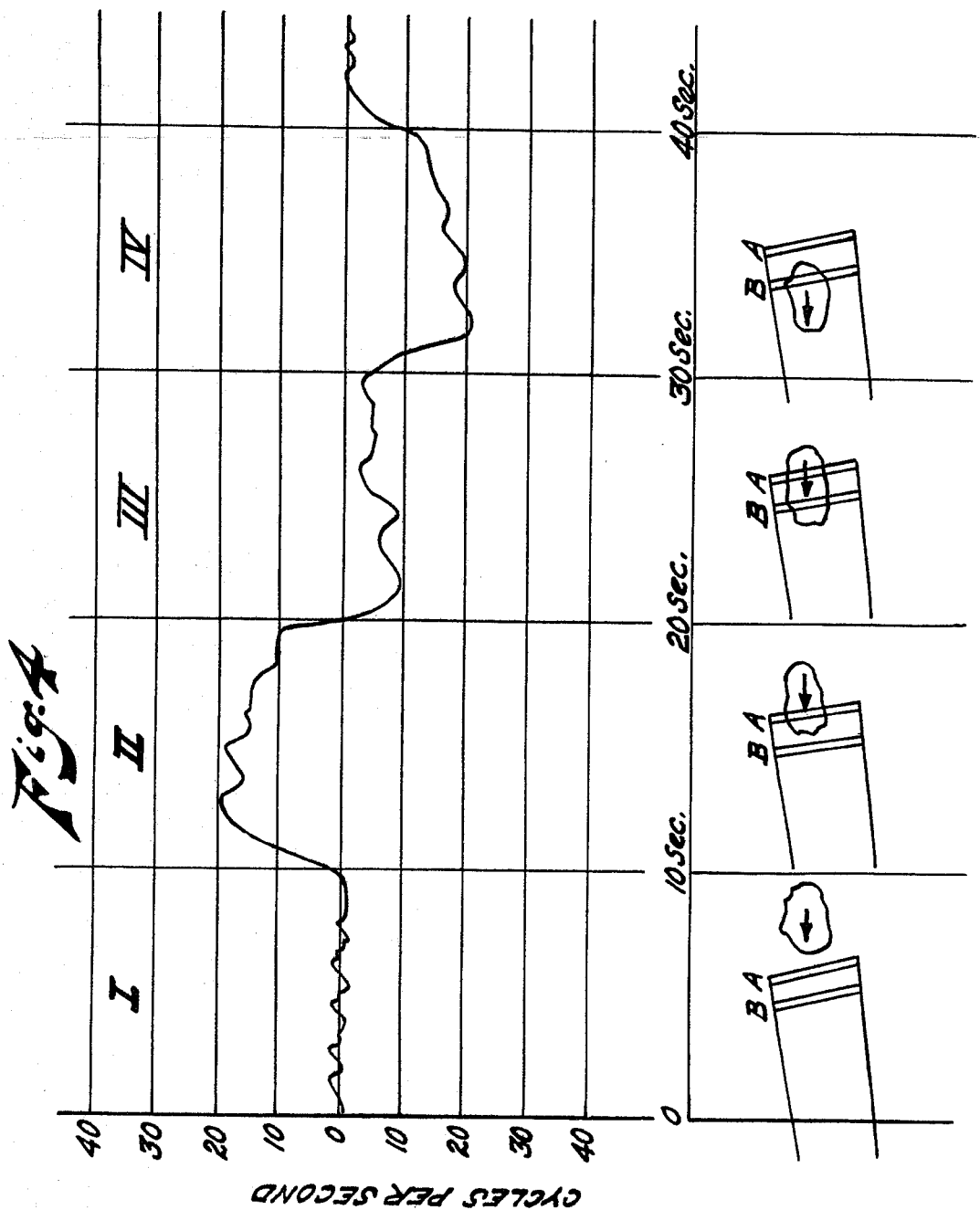
INVENTOR.
HUGH J. SWEENEY
BY *Harry A. Herbert Jr.*
*Herbert E. Farmer* and
ATTORNEYS

United States Patent Office 3,341,844
Patented Sept. 12, 1967

3,341,844
RADAR WIND GUST ANALYZER
Hugh J. Sweeney, 92 Pond St., Westwood, Mass. 02090
Filed Aug. 23, 1965, Ser. No. 481,988
4 Claims. (Cl. 343—5)

ABSTRACT OF THE DISCLOSURE

An instrument for determining the velocity of a wind gust as it travels along the radar beam from one sample region to the other. The fluctuation rate of a radar weather echo increases when influenced by a wind gust. By monitoring the difference in echo fluctuation rate in two adjacent range channels the effect of a wind gust is timed as one range channel and then the other is sequentially influenced in time. Since the range separation of the channel is predetermined and the propagation time of the gust along the beam is measured, the velocity can be calculated.

---

The invention described herein may be manufactured and used by or for the United States Government for governmental purposes without payment to me of any royalty thereon.

This invention relates to systems for ascertaining atmospheric conditions, and more particularly, to a meteorological radar system for measuring the velocity, extent and repetition rate of the wind gustiness aloft.

This invention has utility in allowing a radar observer to analyze the horizontal and vertical wind field aloft with either incoherent or coherent radar.

The present invention provides a novel method of determining the velocity of a gust of wind as it travels from one range element to another, which method includes the step of taking two simultaneous measurements of the variance of the echo amplitude fluctuations along the radar beam at a preselected volume and amplitude.

This variance is a direct measure of the gust velocity distribution of the precipitation particles influenced by the wind field. Since the two volumes along the beam selected for measurements are relatively close together and equal in range duration, it can be assumed that the measurements will be taken from equal volumes at approximately the same altitude. As a result the variance due to wind shear, particle fall velocities and pulse to pulse radar instabilities are present simultaneously in both measurement volumes in equal amounts and can therefore be cancelled out. A wind gust traveling perpendicular to the wave fronts in the beam and influencing the motion of particles first in one measurement area and then later (in time) in the second measurement area can be recorded in real time. The instant variance differencing technique indicates when the gust entered the first measurement volume, the time lapse before it entered the second measurement volume, and how long it remained in any one or both volumes. From the above set of measurements the following parameters of wind gusts are recorded: (1) Velocity of gusts toward or away from radar antenna; (2) Time duration of gusts (life span); (3) Repetition rate of gusts; and (4) Non-uniformities within gusts, i.e. buildup, decay, turbulence.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 illustrates the sample regions under consideration;

FIGURES 3a and 3b illustrate the boxcar circuit input and output, respectively;

FIGURE 4 illustrates the type of information obtained using the instant technique; and FIGURE 5 illustrates the sample regions under consideration in determining horizontal wind shear.

FIGURE 1 illustrates the radar beam pointing in the direction of the prevailing winds with measurement volumes A and B indicated within the beam. These volumes are adjusted so that both are equal in duration to the transmitted radar pulse and separated in range by approximately 1000 feet.

Figure 2:
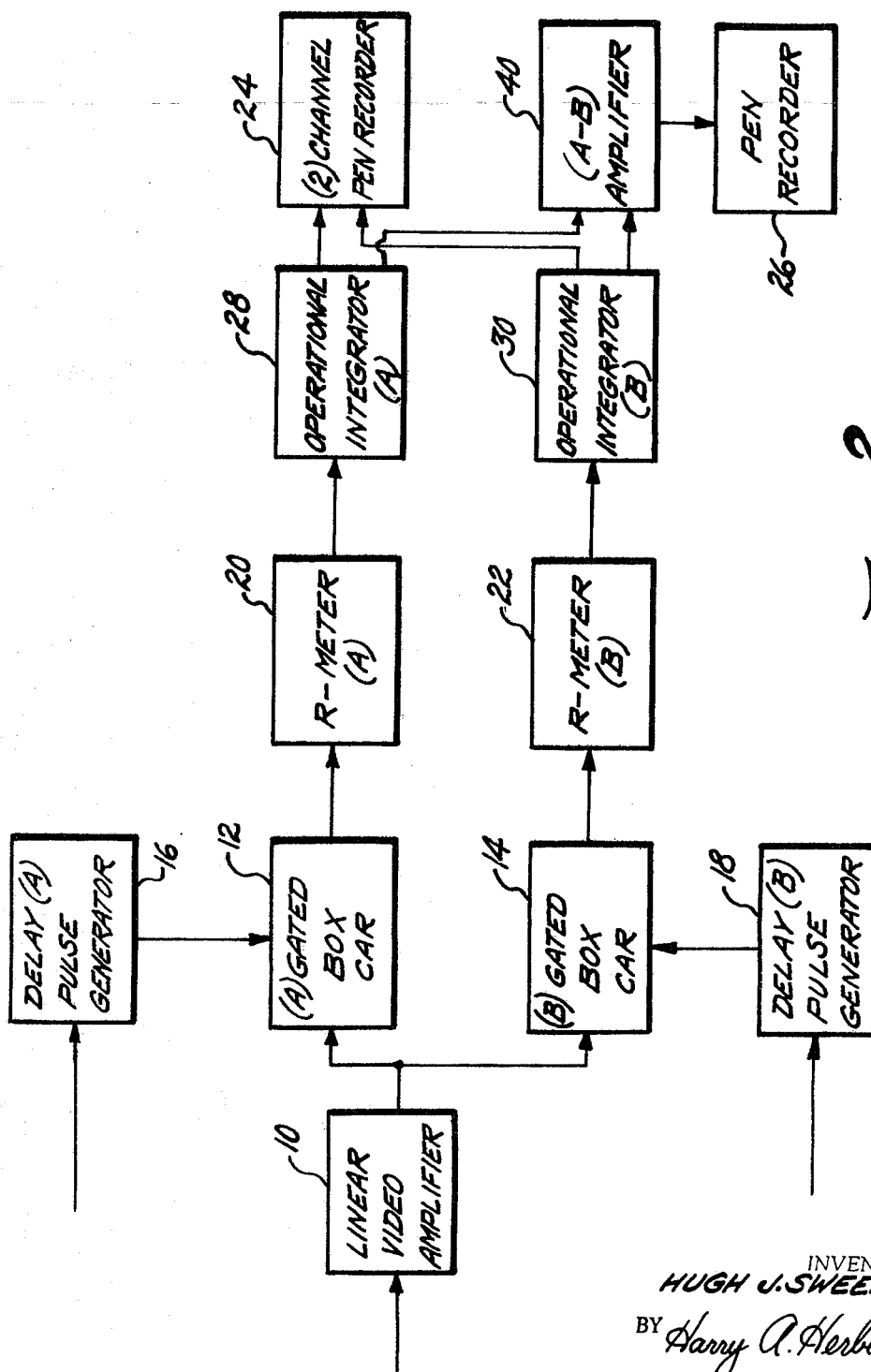
FIGURE 2 is a block diagram of apparatus in which the invention may be embodied.

Now referring to FIGURE 2, radar video (linear amplifier) 10 is fed into boxcar generators 12 and 14 where range delay circuits 16 and 18 gate out the video corresponding to the measurement volumes A and B. The function of the boxcar circuit is to convert this pulse voltage (FIGURE 3a) whose peak amplitude varies at an audio rate, into a voltage form more suitable for analysis of the fluctuation rate. It is to be noted that FIGURE 3a represents either sampled Doppler information or sampled incoherent amplitude fluctuations. The voltage waveform, FIGURE 3b, produced by the boxcar circuit is a stepped voltage wave, sampled at the trigger repetition rate (PRF), whose amplitude is a function of the peak sample taken at the selected range. The function of R-meters 20 and 22 is to sense the number of zero-crossings per unit of time in the waveform produced by the boxcar circuit and generate a current which is proportional to the rate of zero-crossings per second. In FIGURE 3b, the horizontal axis shows an elapse of 17 radar PRF intervals. The zero-crossings occur at the 1st, 9th, and 17th PRF interval. The current thus produced is a direct measure of the variance of the amplitude fluctuation distribution or of the wind and fall velocity distribution. The function of two-pen recorder 24 is to record separately the calibrated variance, the outputs from integrators 28 and 30, from the contributing regions A and B. The function of (A–B) amplifier 40 is to amplify the difference in indicated variance between channels A and B. Any contributions in variance common to both channels are cancelled out. In this manner minute differences in variance are easily detected and recorded by recorder 26.

FIGURE 4 illustrates the type of information which is recorded at (A–B) amplifier 40 using the subject technique on a hypothetical gust model. During the first 10 seconds of the record, as shown in region I, the variance from regions A and B are approximately equal and cancel out. Slight variations on the record indicate small inhomogeneities in horizontal wind shear. At the 10 second time mark the wind gust starts to influence the sample region A. The recorder pen, as shown in region II, swings up in the positive direction indicating increased variance in region A compared to region B. The somewhat longer variations in the record during this period indicate non-uniformities within the gust. At the 20 second time mark the gust front arrives at the sample region B. The recorder pen, as shown in region III, swings down toward the zero difference mark and continues on slightly into the negative region-indicating the gust velocity is slightly higher in the leading front than in the center portion. At the 30 second time mark the trailing edge of the gust passes out of region A and affects only region B—as indicated in region IV. The recorder pen swings down into the negative region indicating the magnitude of the difference. Comparison of the amplitude in region A and region B indicates a decrease in velocity from leading edge to trailing edge of gust. The motion of the gust front can easily be calculated from the known distance traveled (between leading edges of regions A and B) and the elapsed time of travel. In like manner the motion of the gust tail can be calculated from the recorded time interval and known distance between lagging edges of the same regions. From these calculations a good estimate of the extent and rate of expansion of the gust along the radar beam can be made.

The critical parameter in all measurements in the correlation of gust fronts from one sample region to the next. The spacing between sample regions can be adjusted to optimize the correlation factor for individual storm conditions. By utilizing the measurement techniques indicated above, the total horizontal wind effect on the scatter is known. It is also known that the total horizontal wind effect is composed of the sum of two components, i.e., the steady horizontal wind and the gust component. Since the increase in variance of the amplitude fluctuation distribution due to the gust alone has been measured and related to velocity and the total horizontal wind velocity of the gust computed, it is now possible to obtain by substraction the contribution due to the steady horizontal wind component. It is to be noted that particle fall velocities, pulse to pulse radar instabilities, and horizontal wind shear do not adversely affect these measurements.

FIGURE 5 illustrates the type of information which can be recorded at (A–B) amplifier 40 using the same technique for measuring horizontal wind shear. Sample regions A and B are positioned along the radar beam so that they are sampling adjacent elevation volumes and remain close enough together in range so that their contributing volumes are essentially equal. This configuration restricts the useful elevation angles since the area cross-section of the radar beam increases with range. At low elevation angles the requirement for sampling adjacent elevation volumes, places the sampling gates so far apart in range that the contributing regions differ greatly in volume. In Case I, FIGURE 5, the variance due to wind shear sampled in region A is small compared to the variance measured in region B. The (A–B) technique will record the difference in the wind shear gradient. In Case II the variance due to wind shear is the same in both sample regions and the pen recorder will indicate the equality with a zero reading. Duplication of the double gates at each of the elevation volumes and taking two sets of gust measurements yields even more information on horizontal wind shear.

There has accordingly been described and shown herein a novel and useful technique for indicating the types and severity of wind patterns aloft associated with storms. While I have described the above principles of my invention in connection with an incoherent radar, it is to be clearly understood that this description is made only by way of example and not as a limitation to the scope of the accompanying claims. For example, the instant invention can be used with coherent radar. Furthermore, duplication of the instant circuitry at various altitudes can provide a profile of the gustiness along the beam as well as a measure of the non-uniformities in wind shear.

What I claim is:

1. In a weather radar system wherein radar apparatus is employed to transmit signals to and receive echo signals from a given area aloft, means for determining the velocity of a gust of wind comprising means for responding only to echo signals received from two range sample regions along the radar beam, each of said sample regions having a predetermined azimuth, volume and altitude, means for measuring the echo amplitude fluctuations in units of zero-crossings of said echo signals per unit of time, received from the first of said two sample regions, means for measuring later in time the echo amplitude fluctuations received from the second of said range elements, and means for comparing simultaneously with each other the echo amplitude fluctuations from each range element.

2. The apparatus as described in claim 1 wherein said two sample regions are both equal in duration to the said transmitted radar pulse and are separated in range by about 1000 feet.

3. The apparatus as described in claim 1 wherein said means for measuring the received echo amplitude fluctuations comprises radar video amplifier means, means for gating and sampling the amplitude of said video in proportion to the volume of the sample region under observation, voltage-shaping means connected to said radar video means and said gating means for producing a stepped voltage wave, means for sampling said stepped voltage wave at the trigger repetition rate of said radar apparatus, and means connected to said sampling means for producing a current directly proportional to the variance of the echo amplitude fluctuations in the sample region under consideration.

4. The apparatus as described in claim 1 wherein said means for comparing simultaneously the echo amplitude fluctuations received from each of said two range elements comprises means for recording separately the variance in echo fluctuations from each of said two sample regions, means for amplifying any difference in variance between the two said range elements, and means for recording the difference in variance between the said two sample regions to determine the velocity of a gust of wind as it travels from one sample region to the other.

No references cited.

RODNEY D. BENNETT, *Primary Examiner.*

C. L. WHITHAM, *Assistant Examiner.*